P. F. DUNDON.
RESILIENT TIRE ATTACHMENT FOR VEHICLE WHEELS.
APPLICATION FILED DEC. 9, 1913.
1,126,424.
Patented Jan. 26, 1915.
2 SHEETS—SHEET 2.
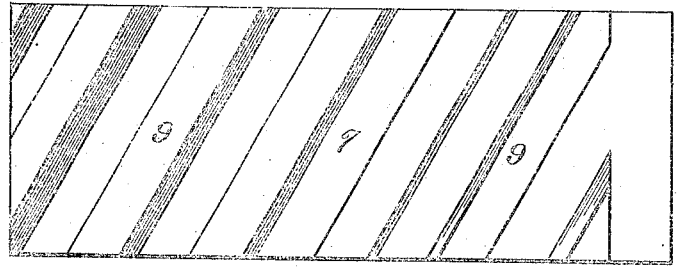
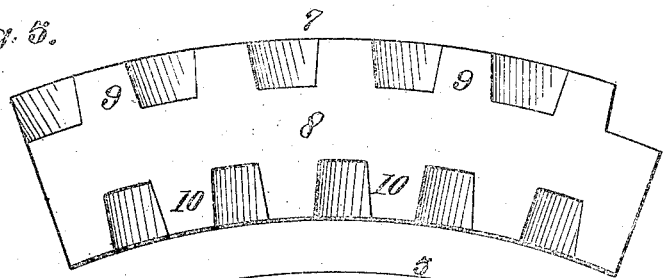
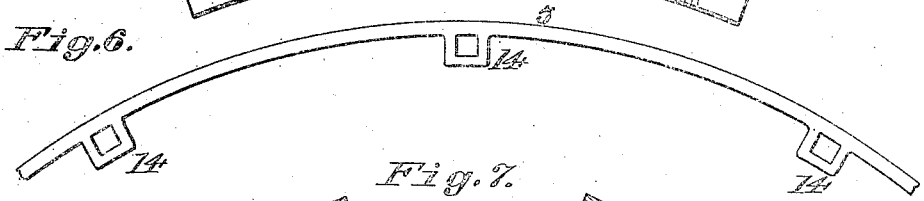
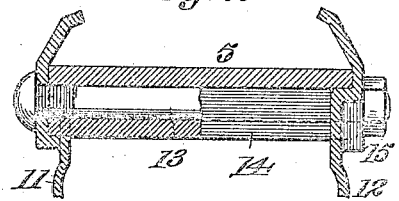
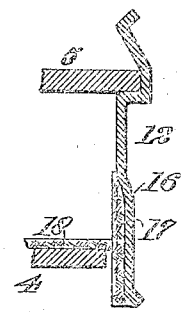
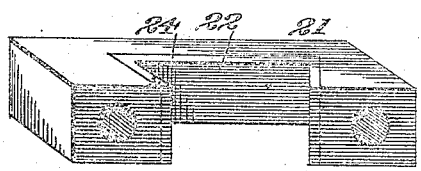
WITNESSES:
Charles Rokles
Thos Bradberg
INVENTOR
Patrick F. Dundon,
BY G. H. Strong,
ATTORNEY

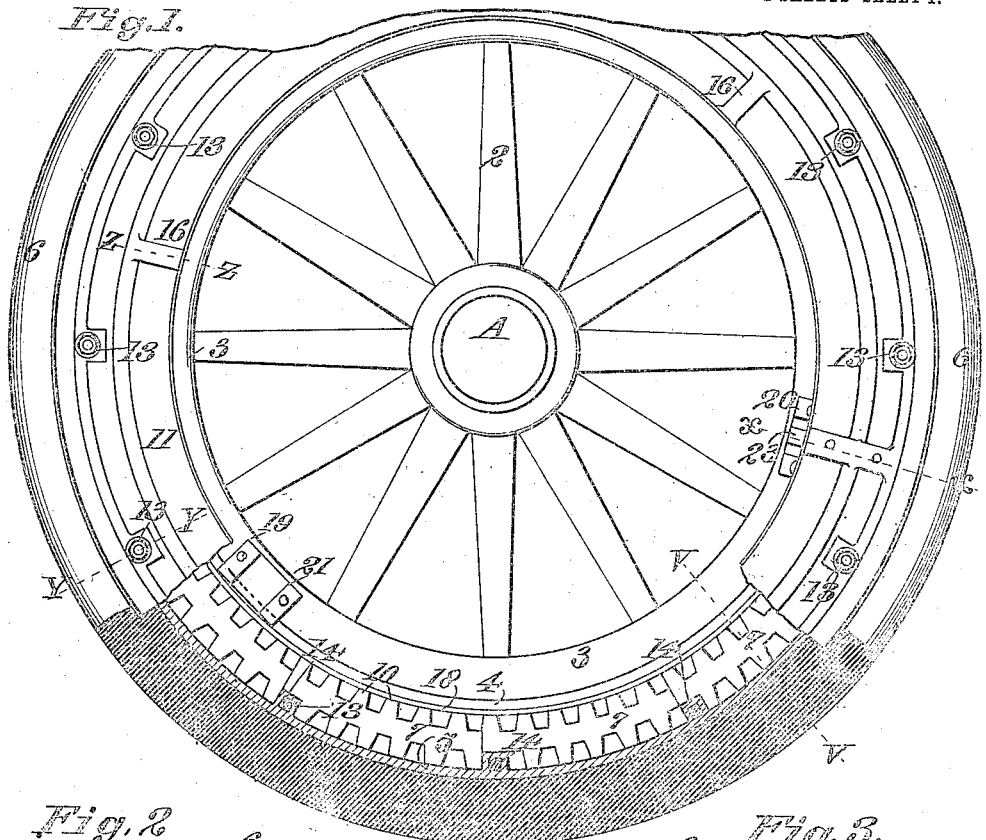
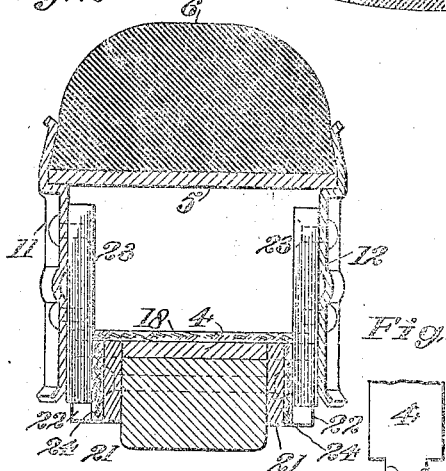
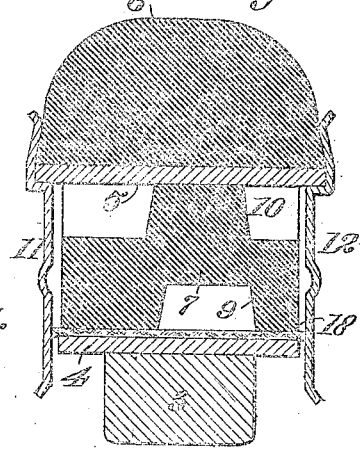

UNITED STATES PATENT OFFICE.

PATRICK F. DUNDON, OF SAN FRANCISCO, CALIFORNIA.

RESILIENT TIRE ATTACHMENT FOR VEHICLE-WHEELS.

1,126,424. Specification of Letters Patent. Patented Jan. 26, 1915.

Application filed December 9, 1913. Serial No. 805,495.

*To all whom it may concern:*

Be it known that I, PATRICK F. DUNDON, a citizen of the United States, residing in the city and county of San Francisco and State of California, have invented new and useful Improvements in Resilient Tire Attachments for Vehicle-Wheels, of which the following is a specification.

This invention relates to improvements in an attachment to produce resiliency in wheels, and in particular to such as would be used for automobiles and the like.

The object of the invention is to provide a simple, strong, durable, highly-resilient tire of this type which is so constructed that the cushioning devices together with other connected parts may be applied to any otherwise completed wheel, and removed or replaced if necessary by the most unskilled person.

Other objects will appear hereinafter.

The invention consists of the parts and the construction and combination of parts as hereinafter more fully described and claimed, having reference to the accompanying drawings, in which,—

Figure 1 is a side elevation of the wheel partly broken away and partly in section. Fig. 2 is a cross section of the wheel on the line X—X of Fig. 1. Fig. 3 is a cross section on the line V—V, Fig. 1. Fig. 4 is a plan view of one of the resilient rubber cushion members interposed between the outer floating ring and felly tire. Fig. 5 is a side elevation of same. Fig. 6 is an enlarged fragmentary side elevation of the outer floating ring. Fig. 7 is a section on the line Y—Y of Fig. 1. Fig. 8 is a fragmentary section on the line Z—Z of Fig. 1. Fig. 9 is a perspective view of the key-retaining bracket. Fig. 10 is a perspective view of the key. Fig. 11 is a detail view of the metal tire.

In the drawings A indicates the hub, 2 the spokes and 3 the felly of a standard form of wheel. Suitably secured to the outer periphery of the felly is a metal tire 4, preferably a little wider than the felly, and surrounding the tire in spaced concentric position with relation to same is a secondary tire or floating ring 5 on which is mounted a solid tire 6 of suitable construction.

Interposed between the outer floating ring 5 and the main tire 4 are a suitable number of resilient rubber cushions, generally indicated at 7. The construction of these rubber cushions is more clearly illustrated by referring to Figs. 1 to 5, inclusive. These cushions consist of a central main web 8, having projecting ribs 9 and 10 formed on its upper and lower surfaces, preferably placed in a diagonal position, as indicated in Fig. 4. The floating ring 5, together with the rubber cushions 7, are held in position with relation to the inner tire 4 by a pair of annular side plates 11 and 12 which are in turn secured to the outer ring 5 by bolts 13, having peripheries bent to grip the tire 6.

Extending across the inner surface of the floating ring 5 in spaced position with relation to each other, are inwardly extending channeled bolt housings 14, through which and the side plates 11 and 12 the bolts are adapted to pass. The openings formed on the side plates are preferably square for the purpose of permitting the insertion of bolts having square shanks. The side plates 11 and 12, together with the floating tire ring 5, are thus securely locked together and any turning movement of the bolts or loosening of the nuts is practically prevented by reason of the construction provided. The outer annular plates 11 and 12 are further locked against creeping or peripheral movement with relation to the ring 5 by having recesses 15 formed therein, which are adapted to register with the ends of the inwardly extending bolt housings 14. Channels are formed across the abutting ends of the resilient cushions and the housings 14 pass through these channels from side to side, thus preventing the cushions from creeping or becoming displaced. The side plates 11 and 12 are also provided with a suitable number of recesses, indicated at 16, (see Figs. 1 and 8), which recesses are adapted to receive and retain a suitable packing 17, such as felt which is riveted to the side plates; this being provided for the purpose of preventing any rattling or noise between the side plates and the inner tire 4. The inner tire 4 is similarly surrounded by a ring of felt or like material, as at 18, for the purpose of further preventing any rattling between the different parts and also for the purpose of packing the inner space against the admission of water or dust.

Secured to the inner felly 3 in two or more places, as indicated at 19 and 20, on opposite sides of the face of the felly, as indicated in Fig. 2, are bracket members 21 provided with dovetailed slots 22; and secured to the inner faces of the side plates 11 and 12 are key members 23 which are also slightly dovetailed in cross section. The bracket members 21, together with the keys 23, are more clearly shown by referring to Figs. 9 and 10; here it can be seen that the keys 23 are considerably narrower than the slots 22, the object of this construction being as follows: The bracket members 21, together with the keys 23, are provided for the purpose of limiting peripheral movement between the inner felly and the side plates 11 and 12 with connected ring 5 and tire 6. However, a radial movement between the inner tire 4 and the outer housing, which comprises the side plates and tire before mentioned, is desirable, and may be obtained by the lock construction provided through the connection of the brackets 21 and the keys 23. The considerable wider area formed in the brackets 21 with relation to the keys 23 is provided for the purpose of permitting a certain amount of play between the brackets and keys when these assume the horizontal position indicated at X—X, Fig. 1; this being necessary to permit the resilient action of the outer tire with relation to the inner tire and felly. The dovetail slots formed in the brackets 21 may be lined with a suitable packing material, indicated at 24, such as leather, rubber, or other suitable material, to prevent actual contact between the metal of the keys and brackets, thus obviating any rattling noises at this point. The keys, together with the brackets 21, may be suitably secured to their respective parts by welding, riveting, bolting, or similar means. It can also be seen that the tire 4, by referring to Fig. 2, is notched at the edge, as at 26, to permit the insertion of the bracket members 21, and also for the purpose of further securing these against twisting strain. The dovetail shape of the registering keys and slots is provided for the purpose of preventing the keys from slipping out of the slots when the strain is applied. It can easily be seen that by providing the dovetail-shaped slots and keys constructed as here shown that the tendency will be to draw the respective parts together rather than to spread them apart when the driving strain is transmitted to the wheel.

The wheel constructed as here shown has radial freedom within the housing, but by means of locks and keys when power is applied to the wheel the housing, cushions and treads are securely kept in their proper place and position and revolve in either direction with the wheel. No special design of wheel is required, but it is preferable to have the wheel tire wider than the felly.

The wheel, as here shown, has an annular continuous chamber, without obstructions or interruptions, formed thereon, and no impeding projections upon the base surfaces where the cushions have their foundation. The resilient cushions and sections extend continuously over the full circumference, and the angular position of the ribs formed thereon will thus afford resiliency and bearing surfaces at every point of the circumference of the wheel. The bolted side plates are securely kept equal distances apart by the binding bolts and the floating ring 5, thus preventing any binding of the wheel tire which will always be slightly narrower than the space between the side plates.

It is further evident that the cushion members contained within the housing are free from any tensile strain for the reason that compression takes place only at the lower half of the wheel. The cushion members and other connected parts may be easily removed or replaced for the purpose of renewal or examination, if necessary, even by the most unskilled person, as it is only necessary to remove one side plate for this purpose.

The materials and finish of the several parts of the tire are such as the judgment and experience of the manufacturer may dictate.

Having thus described my invention what I claim and desire to secure by Letters Patent is:

1. In a vehicle wheel attachment of the character described, a movable structure including concentric interspaced rings, the inner of which fits the wheel felly, an interposed cushion of resilient material, annular side plates fixed to and movable with the outer ring by the compression of the intermediate cushion, channeled bracket members secured to the sides of the felly, and dovetailed keys fixed to the inner faces of the plates to allow compression and limit peripheral movement between said members, the side plates being recessed on their inner faces and provided with flexible wear plates arranged in said recesses.

2. In combination with a wheel and cushioning means on the felly thereof, a tire engaged with the cushioning means, transverse housings formed on the inner circumference of the tire, side plates engaged with the tire, and bolts passed through the side plates and housings, said side plates having outwardly extending sockets into which the ends of the housings project and said cushioning means having transverse channels into which said housings extend to prevent creeping of said cushioning means.

3. In combination with a wheel and cushioning means on the felly thereof, a tire engaged with the cushioning means, side plates secured to the tire, brackets formed independent of the felly and secured to the side faces of the felly and projecting outwardly from said side faces and having slots which extend radially of the wheel, and keys also disposed radially of the wheel and secured to the inner faces of the side plates secured to the tire, said keys being narrower than the slots so as to move laterally thereof, and engaged in the latter.

In testimony whereof I have hereunto set my hand in the presence of two subscribing witnesses.

PATRICK F. DUNDON.

Witnesses:
CHARLES EDELMAN,
C. C. COOK.